(12) United States Patent
Bulea et al.

(10) Patent No.: US 9,870,109 B2
(45) Date of Patent: Jan. 16, 2018

(54) DEVICE AND METHOD FOR LOCALIZED FORCE AND PROXIMITY SENSING

(71) Applicant: Synaptics Incorporated, San Jose, CA (US)

(72) Inventors: Mihai Bulea, Santa Clara, CA (US); Pascale El Kallassi, Menlo Park, CA (US)

(73) Assignee: Synaptics Incorporated, San Jose, CA (US)

( * ) Notice: Subject to any disclaimer, the term of this patent is extended or adjusted under 35 U.S.C. 154(b) by 58 days.

(21) Appl. No.: 14/924,381

(22) Filed: Oct. 27, 2015

(65) Prior Publication Data

US 2016/0048243 A1 Feb. 18, 2016

Related U.S. Application Data

(63) Continuation of application No. 13/797,669, filed on Mar. 12, 2013, now Pat. No. 9,195,354.

(51) Int. Cl.
*G06F 3/041* (2006.01)
*G06F 3/044* (2006.01)
*G06F 3/0354* (2013.01)

(52) U.S. Cl.
CPC ............ *G06F 3/044* (2013.01); *G06F 3/0414* (2013.01); *G06F 3/0416* (2013.01); *G06F 3/03547* (2013.01); *G06F 2203/04105* (2013.01); *G06F 2203/04106* (2013.01); *G06F 2203/04112* (2013.01)

(58) Field of Classification Search
CPC ........ G06F 3/044; G06F 3/0416; G06F 3/041; G06F 3/016; G06F 3/0412; G06F 3/0414; G06F 3/03547; G06F 2203/04106; G06F 2203/04105
See application file for complete search history.

(56) References Cited

U.S. PATENT DOCUMENTS

| 5,510,813 | A | | 4/1996 | Makinwa et al. | |
|---|---|---|---|---|---|
| 5,942,733 | A | * | 8/1999 | Allen | G06F 3/044 |
| | | | | | 178/18.01 |
| 6,002,389 | A | * | 12/1999 | Kasser | G06F 3/041 |
| | | | | | 178/18.01 |
| 7,154,481 | B2 | * | 12/2006 | Cross | G06F 3/0412 |
| | | | | | 178/18.01 |

(Continued)

FOREIGN PATENT DOCUMENTS

WO 2013009778 A1 1/2013

OTHER PUBLICATIONS

International Preliminary Report on Patentability issued in the corresponding International Application No. PCT/US2014/023037, dated Sep. 24, 2015 (10 pages).

*Primary Examiner* — Dismery Mercedes
(74) *Attorney, Agent, or Firm* — Osha Liang LLP

(57) ABSTRACT

Methods, systems and devices are described for operating an electronic system which includes a first plurality of sensor electrodes disposed in a first layer and configured to detect input objects at an input surface of the input device, the first plurality of sensor electrodes including a first subset of transmitter electrodes; a second plurality of sensor electrodes configured to detect a force imparted to the input surface and configured for capacitive coupling with the first subset of transmitter electrodes; and a compressible dielectric configured to compress in response to force applied to the input surface. The capacitive coupling between the transmitter electrodes and the second plurality of sensor electrodes is configured to vary in response to the applied force.

16 Claims, 6 Drawing Sheets

(56) References Cited

U.S. PATENT DOCUMENTS

| | | | |
|---|---|---|---|
| 7,395,717 B2 | 7/2008 | DeAngelis et al. | |
| 7,511,702 B2* | 3/2009 | Hotelling | G06F 3/0414 |
| | | | 178/18.06 |
| 7,538,760 B2 | 5/2009 | Hotelling et al. | |
| 7,609,178 B2* | 10/2009 | Son | G06F 3/016 |
| | | | 200/600 |
| 8,063,886 B2 | 11/2011 | Serban et al. | |
| 8,618,428 B2 | 12/2013 | Bulea | |
| 8,627,716 B2 | 1/2014 | Son | |
| 8,730,199 B2* | 5/2014 | Sleeman | G01L 1/146 |
| | | | 345/173 |
| 8,857,274 B2* | 10/2014 | Mamigonians | G01L 1/142 |
| | | | 73/862.626 |
| 9,075,095 B2* | 7/2015 | Kallassi | G01R 27/2605 |
| 9,112,058 B2* | 8/2015 | Bao | H01L 29/84 |
| 9,201,468 B2* | 12/2015 | Schediwy | G06F 1/1692 |
| 9,274,654 B2* | 3/2016 | Slobodin | G06F 3/044 |
| 9,281,415 B2* | 3/2016 | Bao | H01L 29/84 |
| 9,632,638 B2* | 4/2017 | Worfolk | G06F 3/044 |
| 2001/0013855 A1 | 8/2001 | Fricker et al. | |
| 2004/0090429 A1 | 5/2004 | Geaghan et al. | |
| 2006/0260417 A1 | 11/2006 | Son et al. | |
| 2007/0229464 A1* | 10/2007 | Hotelling | G06F 3/0414 |
| | | | 345/173 |
| 2007/0236466 A1 | 10/2007 | Hotelling | |
| 2008/0018608 A1* | 1/2008 | Serban | G06F 3/0416 |
| | | | 345/173 |
| 2008/0158173 A1 | 7/2008 | Hamblin et al. | |
| 2008/0174321 A1 | 7/2008 | Kang et al. | |
| 2009/0091551 A1 | 4/2009 | Hotelling et al. | |
| 2009/0267916 A1 | 10/2009 | Hotelling | |
| 2009/0314621 A1 | 12/2009 | Hotelling | |
| 2010/0013785 A1* | 1/2010 | Murai | G06F 3/047 |
| | | | 345/173 |
| 2010/0020032 A1* | 1/2010 | Mamba | G06F 3/044 |
| | | | 345/173 |
| 2010/0242629 A1 | 9/2010 | Leuenberger et al. | |
| 2010/0253651 A1* | 10/2010 | Day | G06F 3/044 |
| | | | 345/175 |
| 2010/0282000 A1 | 11/2010 | Gorjanc et al. | |
| 2011/0057899 A1 | 3/2011 | Sleeman et al. | |
| 2011/0096025 A1 | 4/2011 | Slobodin et al. | |
| 2011/0141053 A1* | 6/2011 | Bulea | G06F 3/0416 |
| | | | 345/174 |
| 2012/0013573 A1 | 1/2012 | Liu et al. | |
| 2012/0026124 A1 | 2/2012 | Li et al. | |
| 2012/0038583 A1 | 2/2012 | Westhues et al. | |
| 2012/0062245 A1 | 3/2012 | Bao et al. | |
| 2012/0092350 A1* | 4/2012 | Ganapathi | G02B 26/0833 |
| | | | 345/501 |
| 2012/0105333 A1* | 5/2012 | Maschmeyer | G06F 3/016 |
| | | | 345/173 |
| 2012/0105367 A1 | 5/2012 | Son et al. | |
| 2012/0206401 A1 | 8/2012 | Lin et al. | |
| 2012/0222498 A1 | 9/2012 | Mamigonians | |
| 2012/0274599 A1* | 11/2012 | Schediwy | G06F 3/016 |
| | | | 345/174 |
| 2012/0313873 A1 | 12/2012 | Bright et al. | |
| 2013/0015868 A1* | 1/2013 | Peng | G06F 3/044 |
| | | | 324/688 |
| 2013/0018489 A1* | 1/2013 | Grunthaner | G06F 3/041 |
| | | | 700/73 |
| 2013/0021089 A1 | 1/2013 | Sakurai et al. | |
| 2013/0030740 A1 | 1/2013 | Bulea | |
| 2013/0050139 A1 | 2/2013 | Gute | |
| 2013/0088448 A1* | 4/2013 | Seo | G06F 3/044 |
| | | | 345/173 |
| 2013/0106765 A1 | 5/2013 | Beecher et al. | |
| 2013/0141382 A1* | 6/2013 | Simmons | G06F 3/044 |
| | | | 345/174 |
| 2013/0257784 A1 | 10/2013 | Vandermeijden et al. | |
| 2014/0062933 A1* | 3/2014 | Coulson | G06F 3/044 |
| | | | 345/174 |
| 2014/0062934 A1* | 3/2014 | Coulson | G06F 3/044 |
| | | | 345/174 |
| 2015/0130742 A1 | 5/2015 | Chen et al. | |

* cited by examiner

DEVICE AND METHOD FOR LOCALIZED FORCE AND PROXIMITY SENSING

CROSS-REFERENCE TO RELATED APPLICATION

The present application is a continuation application of and, thereby, claims benefit under 35 U.S.C. §120 to U.S. application Ser. No. 13/797,669, entitled, "DEVICE AND METHOD FOR LOCALIZED FORCE AND PROXIMITY SENSING," filed on Mar. 12, 2013, and incorporated herein by reference.

FIELD OF THE INVENTION

This invention generally relates to electronic devices, and more specifically relates to sensor devices and using sensor devices for producing user interface inputs.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Some input devices also have the ability to detect applied force in addition to determining positional information for input objects interacting with a sensing region of the input device. However, in presently known force/touch input devices, the transmitting and receiving electrodes are arranged in three layers. Disposing the transmitter and receiver electrodes in multiple layers requires complex geometric and electrical configurations to avoid ohmically connecting (shorting) the electrodes. Moreover, the cross coupling of the force receivers and touch receivers makes it difficult to accurately locate an input object (e.g., finger) where an input surface experiences deflection due to an applied input object. These factors limit the flexibility and usability of presently known force enabled input devices. A full transcapacitive image sensor is thus needed in which the transmitting and receiving electrodes are disposed in a single layer or, alternatively, in two layers.

BRIEF SUMMARY OF THE INVENTION

Embodiments of the present invention provide a device and method that facilitates improved device usability. The device and method provide improved user interface functionality by strategically arranging the transmitter and receiver electrodes within a single layer or, alternatively, in two layers. In addition, by placing a ground trace electrode between the transmitter and receiver electrodes, the effects of input surface deflection may be effectively removed from the touch signal.

Specifically, the processing system associated with the image sensor may be configured to toggle the ground trace electrode to selectively function as a ground electrode and a force receiver electrode. When the ground trace electrode is in the ground state, the adjacent touch receiver electrode produces a signal indicative of the position of an input object substantially independent of deflection (e.g., a translation and/or bending of the input surface). When the ground trace electrode is in the receiving state, it produces a signal which includes a deflection component and a touch component. By appropriately processing the "touch" signal and the "deflection plus touch" signal, a substantially pure touch signal may be derived which is independent of deflection; that is, position information for at least one input object may be obtained which is uncorrupted by deflection of the input surface. Furthermore, by appropriately processing the "touch" signal and the "deflection plus touch" signals, a substantially pure deflection signal may be derived which is independent of touch; that is, force information for at least one input object may be obtained.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. User interface functionality may be enhanced by arranging the transmitter and receiver electrodes within a single layer (or two layers), and by providing a ground trace electrode which allows a pure touch signal to be received which is substantially or wholly independent of the capacitive effects of a deflection of the input surface; for example, a bending or translation of the input surface and/or sensor electrodes.

Figure 1:
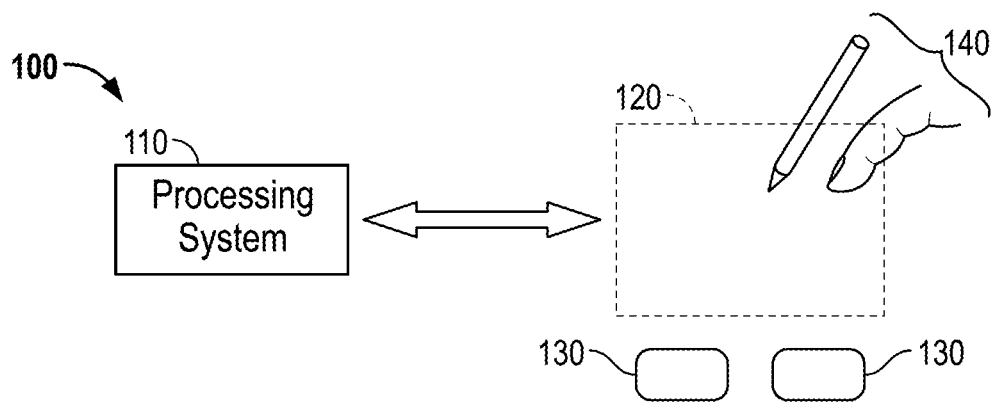
FIG. 1 is a block diagram of an exemplary electronic system that includes an input device and a processing system in accordance with an embodiment of the invention.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 includes sensors for detecting force and proximity, as described in greater detail below in conjunction with FIG. 2. Sensing region 120 may encompass any space above (e.g., hovering), around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The electronic system 100 may utilize any combination of sensor components and sensing technologies to detect user input (e.g., force, proximity) in the sensing region 120 or otherwise associated with the touchpad. The input device 102 comprises one or more sensing elements for detecting user input. As several non-limiting examples, the input device 100 may use capacitive, elastive, resistive, inductive, magnetic, acoustic, ultrasonic, and/or optical techniques.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

In FIG. 1, a processing system 110 is shown as part of the input device 100. However, in other embodiments the processing system may be located in the host electronic device with which the touchpad operates. The processing system 110 is configured to operate the hardware of the input device 100 to detect various inputs from the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information, particularly regarding the presence of an input object in the sensing region. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. For example, buttons (not shown) may be placed near the sensing region 120 and used to facilitate selection of items using the input device 102. Other types of additional input components include sliders, balls, wheels, switches, and the like. Conversely, in some embodiments, the input device 100 may be implemented with no other input components.

In some embodiments, the electronic system 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

As described above, in some embodiments some part of the electronic system processes information received from the processing system to determine input information and to act on user input, such as to facilitate a full range of actions. It should be appreciated that some uniquely input information may result in the same or different action. For example, in some embodiments, input information for an input object comprising, a force value F, a location X,Y and a time of contact T may result in a first action. While input information for an input object comprising a force value F', a location X',Y' and a time of contact T' (where the prime values are uniquely different from the non-prime values) may also result in the first action. Furthermore, input information for an input object comprising a force value F, a location X',Y and a time of contact T' may result in a first action. While the examples below describe actions which may be performed based on input information comprising a specific range of values for force, position and the like, it should be appreciated that that different input information (as described above) may result in the same action. Furthermore, the same type of user input may provide different functionality based on a component of the input information. For example, different values of F, X/Y and T may result in the same type of action (e.g. panning, zooming, etc.), that type of action may behave differently based upon said values or other values (e.g. zooming faster, panning slower, and the like).

As noted above, the embodiments of the invention can be implemented with a variety of different types and arrangements of capacitive sensor electrodes for detecting force and/or positional information. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. There are various usability differences between indirect and direct more which may confuse or prevent full operation of the input device. For example, an indirect input device may be used to position a cursor over a button by moving an input object over a proximity sensor. This is done indirectly, as the motion of the input does not overlap the response on the display. In a similar case, a direct interaction device may be used to position a cursor over a button by placing an input object directly over or onto the desired button on a touch screen.

Figure 2:
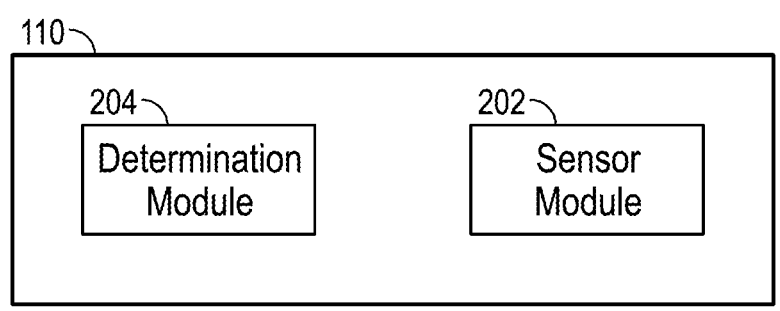
FIG. 2 is a schematic view of an exemplary processing system in accordance with an embodiment of the invention.

Referring now to FIGS. 1 and 2, the processing system 110 includes a sensor module 202 and a determination module 204. Sensor module 202 is configured to receive resulting signals from the sensors associated with sensing region 120. Determination module 204 is configured to process the data, and to determine positional information and force information. The embodiments of the invention can be used to enable a variety of different capabilities on the host device. Specifically, it can be used to enable cursor positioning, scrolling, dragging, icon selection, closing windows on a desktop, putting a computer into sleep mode, or perform any other type of mode switch or interface action.

Figure 3:
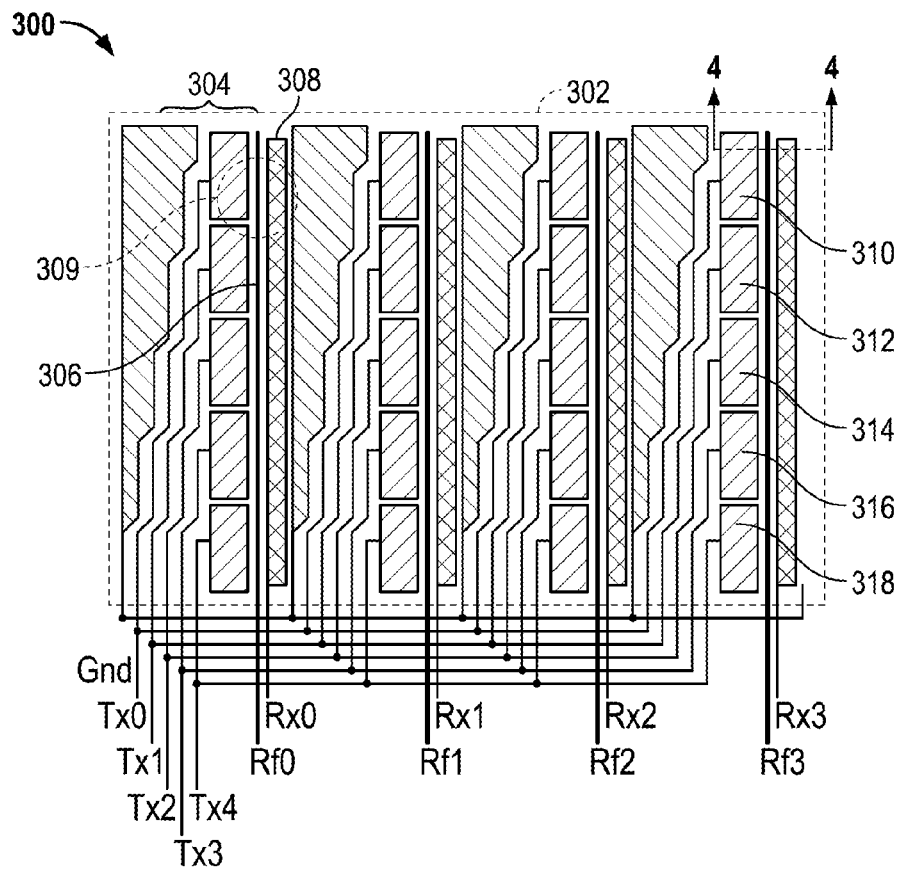
FIG. 3 is a top plan schematic view of a single layer force and touch sensor in accordance with an embodiment of the invention.

Referring now to FIG. 3, a top plan schematic view of a single layer force and touch sensor 300 is shown. Sensor 300 illustrates a portion 302 of sensing region 120. In an embodiment, portion 302 includes a plurality of transmitter electrodes (e.g. 310, 312, 314, 316, 318), a force receiver electrode 306 (also referred to as a ground trace electrode), and a touch receiver electrode 308. As shown, each transmitter electrode and each receiver electrode are configured to form an area of localized capacitance, referred to as a "touch pixel" of "pixel". For example, transmitter electrode 310 is configured to form a trans-capacitance with receiver electrode 308, illustrated as a first pixel 309. Force receiver electrode 306 spans pixel 309 and is electrically connected to a force receiver lead Rf0; similarly, touch receiver electrode 308 spans pixels 309 and is connected to touch receiver lead Rx0, with force receiver electrode 306 being parallel to and disposed between transmitter electrode 304 and touch receiver electrode 308.

Other embodiments may include any number and type of sensor electrodes configured to form any number of pixels. In a further embodiment, one or both of the force receiver electrode and touch receiver electrode may be subdivided into a plurality of respective segments or pixels to enhance the resolution of the touch and force sensing information derived from the touch and force receiver electrodes.

Figure 4:
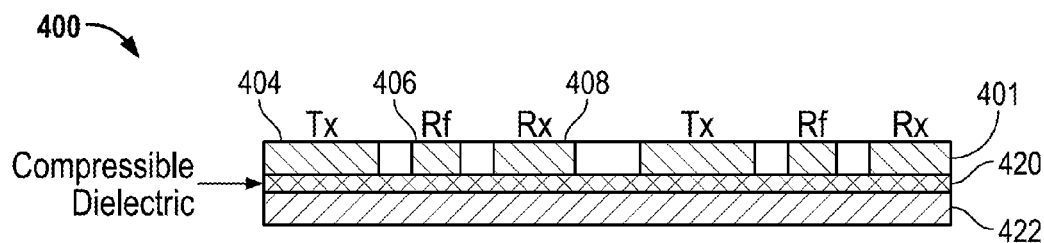
FIG. 4 is cross section view of a portion of the single layer force and touch sensor taken along line IV-IV of FIG. 3 in accordance with an embodiment of the invention.

FIG. 4 is cross section view of a portion of the single layer force and touch sensor taken along line IV-IV of FIG. 3. An embodiment of cross section 400 illustrates an electrode layer 401, a compressible dielectric layer 420, and a liquid crystal diode (LCD) display layer (or ground layer) 422. As implemented, cross section 400 may include additional layers such as, for example, a lens, cover sheet, and/or electrode substrate (omitted from FIG. 4 to enhance clarity). Compressible dielectric layer 420 may comprise air, optical clear adhesive (OCA), or any other compressible medium which may be characterized with a bending or compressible stiffness.

More particularly, electrode layer 401 includes, in cross section, a transmitter electrode 404, a force receiver (or ground trace) electrode 406, and a touch receiver electrode 408 corresponding to electrodes 310, 306, and 308 of FIG. 3, respectively.

Figure 5:
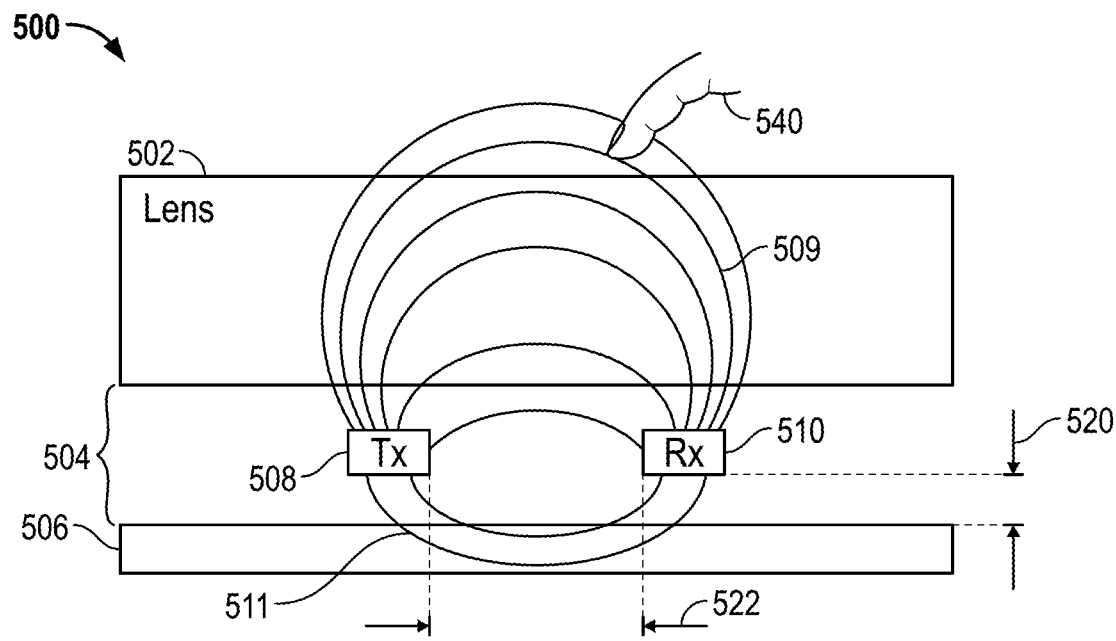
FIG. 5 is a schematic cross section view of a compressible dielectric layer including a transmitter and receiver electrode, the compressible dielectric layer shown sandwiched between a lens and an LCD layer in accordance with an embodiment of the invention.

FIG. 5 is a cross section view of a single layer sensor assembly 500 showing schematic field lines representing the capacitive coupling between the transmitter and receiver electrodes. Assembly 500 includes a conductive layer 506, a compressible dielectric layer 504, and a lens 502 which may be made of glass, plastic, acrylic or the like. An electrode substrate (not shown for clarity) supports a transmitter electrode 508 and a receiver electrode 510. A drive signal applied to transmitter electrode 508 causes capacitive coupling to receiver electrode 510. This capacitive coupling is based at least in part on the dielectric values of the surrounding layers, the magnitude of the drive signal, and the distance 522 between the electrodes. The capacitive coupling (i.e. pixel) between transmitter electrode 508 and the receiver electrode 501 is graphically represented by upper field lines 509 and lower field lines 511.

With continued reference to FIG. 5, upper field lines 509 extend upward through the lens 502. When a conductive input object (e.g., finger) 540 interacts with the sensing region at the surface of or above lens 502, the input object "absorbs" some of the field lines which would otherwise capacitively couple the transmitter electrode 508 and receiver electrode 510. This is the essence of traditional capacitive positional (touch) sensing. In contrast, the lower field lines 511 are electrically drawn into (absorbed by) the conductive layer 506 (e.g., an LCD). Force applied by the input object 540 to lens 502 causes deflection of the lens and the transmitter electrode 508 and receiver electrode 510 to deflect toward conductive layer 506. As applied force decreases the distance 520 between the conductive layer 506 and the electrodes, the capacitive coupling between transmitter electrode 508 and receiver electrode 510 decreases. Consequently, it can be said that the positional information associated with input object 540 may be corrupted in the presence of sufficient deflection of the input surface due to an input object.

Figure 6:
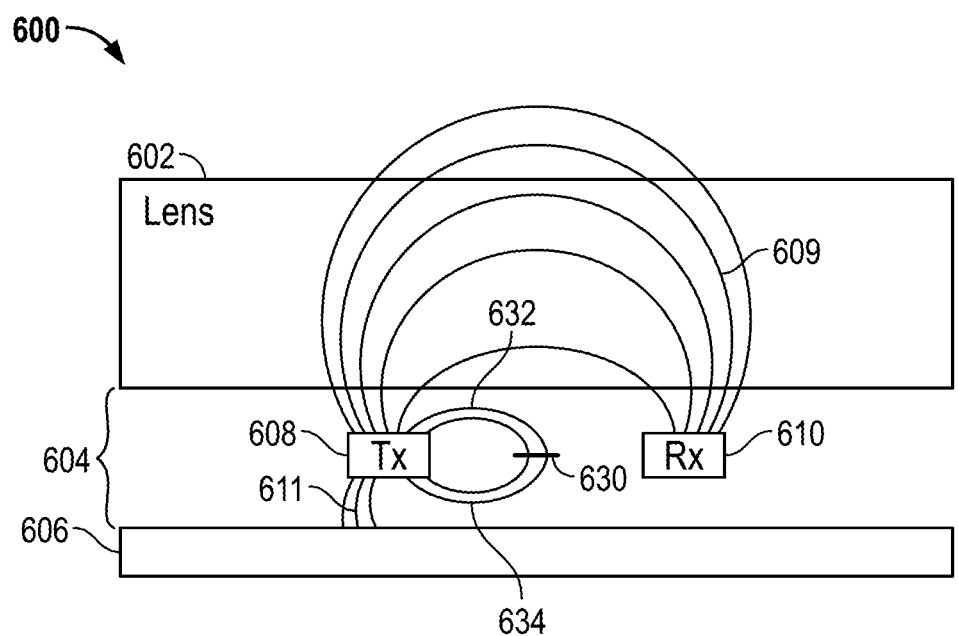
FIG. 6 is a schematic cross section view of the of FIG. 5 further including a ground trace electrode in accordance with an embodiment of the invention.

FIG. 6 is a schematic cross section view of a single layer force/touch sensor assembly 600 analogous to that shown if FIG. 5, further including a ground trace electrode. In accordance with various embodiments, the touch signal may be rendered substantially or entirely insensitive to bending in the presence of a properly configured ground trace electrode.

More particularly, assembly 600 includes a conductive layer 606, a compressible dielectric layer 604, and a lens 602. An electrode substrate (not shown for clarity) supports a transmitter electrode 608, a receiver electrode 610, and a ground trace electrode (also referred to as a force receiver electrode) 630. A drive signal applied to transmitter electrode 608 causes capacitive coupling between transmitter electrode 608 and receiver electrode 610, as well as between transmitter electrode 608 and ground trace electrode 630. The capacitive coupling between the transmitter electrode 608 and the receiver electrode 630 is graphically represented by upper field lines 609 and lower field lines 632. The capacitive coupling between the transmitter electrode 608 and the ground trace electrode 610 is graphically represented by upper field lines 632 and lower field lines 634. As shown, the field lines 634 which would otherwise extend from transmitter electrode 608 to receiver electrode 610, and which are not absorbed by conductor 606, extend between transmitter electrode 608 and ground trace electrode 630.

With continued reference to FIG. 6, as applied force decreases the distance between the conductive layer 606 and the electrodes, the capacitive coupling between transmitter electrode 608 and receiver electrode 610 is substantially or entirely unaffected by bending. That is, the field lines 632, 634 emanating from transmitter electrode 608 are "intercepted" by ground trace electrode 630, and the field lines 611 emanating from transmitter electrode 608 are absorbed by conductive layer 606 when ground trace electrode 630 is either grounded or maintained at an appropriate constant voltage. Consequently, it can be said that the positional information associated with an input object interacting with the sensing region is substantially or wholly insensitive to bending in the presence of ground trace electrode 630.

Referring again to FIG. 4, the processing system associated with the force and touch sensor of the present invention may be configured to selectively toggle the ground trace electrode 406 between a first and second state. More particularly, in the first state, the ground trace electrode 406 may be grounded or, alternatively, maintained at a desired constant voltage. When the ground trace electrode (Rf) 406 is in this "ground" state, touch receiver electrode (Rx) 408 is (exclusively or primarily) sensitive to touch only; that is, Rx 408 is insensitive to bending when Rf 406 is grounded. In the second state, Rf 406 functions as a force receiver electrode and produces a signal having a touch component and a bending component, although the bending component is predominant inasmuch as there are no electrodes or conductors between Tx 404 and Rf 406. In some embodiments, the first and second states may occur simultaneously. Specifically, if the ground trace electrode (Rf) 406 is at a substantially constant potential, the ground trace electrode is configured to accomplish the function of the first state (i.e. to provide a "shielding" effect to the receiver electrode 610 due to any deformation of the input surface) and the second state (i.e. to provide a measurement of the amount of localized deflection of the input surface) simultaneously.

In partial summary and to a first order approximation, it may be said that the touch signal derived from Rx electrode 408 is insensitive to bending when Rf electrode 406 is in the first (ground) state, and that the composite signal derived from Rf electrode 406 is very sensitive to bending when Rf electrode 406 is in the second (receiver) state.

The electromagnetic and mathematical relationships among the signals derived from electrodes Tx 404, Rf 406, and Rx 408 involve Maxwell's equations and are quite complex. Nonetheless, for present purposes, the following first order linear approximations are conceptually useful:

$$Rx = K[\text{touch}] \text{ (when } Rf = \text{ground)}; \text{ and} \quad (1)$$

$$Rf = \alpha[\text{touch}] + \beta[\text{force}] \text{ (when } Rx = \text{ground)}; \quad (2)$$

where K, α, and β are constants which may be derived through simulation and modeling and experimental techniques to determine the appropriate proportions, dimensions (e.g., thickness, width), and various electrical and mechanical properties of the components illustrated in the figures. In one embodiment, a key design goal is to arrange the various electrodes in a single layer, and to configure the foregoing parameters to render Rx 408 insensitive to bending when Rf=ground, and to render Rf very sensitive to bending when Rx=ground. In other embodiments, these parameters may be manipulated to achieve other design objectives such as, for example, arranging the electrodes in two layers as described below in connection with FIG. 7.

Figure 7:
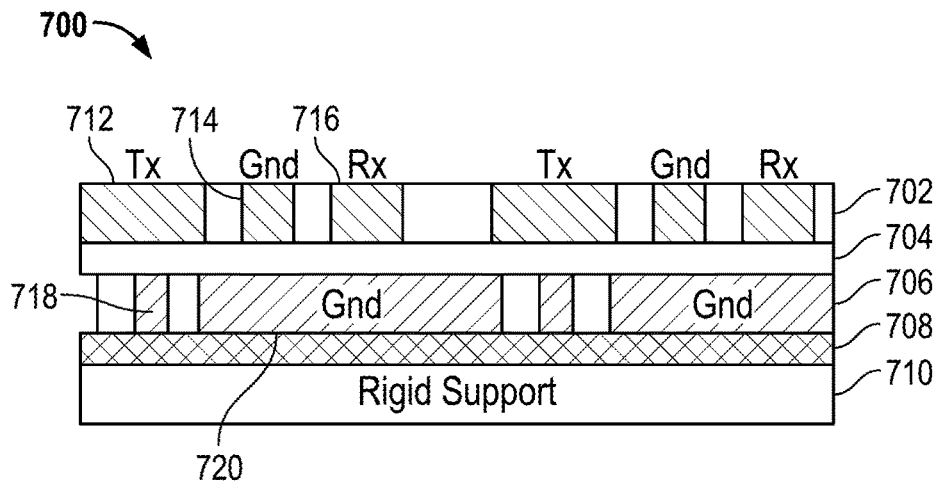
FIG. 7 is a schematic cross section view of a force and touch sensor illustrating electrodes disposed in two layers in accordance with an alternate embodiment of the invention.

FIG. 7 is a schematic cross section view of a force and touch sensor 700 generally analogous to that shown in FIG. 4, but with the electrodes disposed in two layers in accordance with an alternate embodiment of the invention. Sensor 700 includes a first electrode layer 702, a non-compressible dielectric layer 704, a second electrode layer 706, a compressible dielectric layer 708, and a support layer 710 which may be substantially or completely rigid. As implemented, sensor 700 may include fewer layers or additional layers such as, for example, a lens, cover sheet, and/or one or more electrode substrates (not shown for clarity). Compressible dielectric layer 708 may comprise air, optical clear adhesive (OCA), or any other compressible medium which may be characterized with a bending or compressible stiffness.

First electrode layer 702 includes a plurality of transmitter electrodes 712, ground electrodes 714, and touch receiver electrodes 716. Second electrode layer 706 includes a plurality of force receiver electrodes 718 and ground electrodes 720. Applying the principles discussed above, it can be seen that touch receiver electrodes 716 which for example, are measuring a trans-capacitance to transmitter electrode 712, are sensitive to touch but insensitive to bending (largely due to the presence of non-compressible layer 704). Force receiver electrodes 718, which for example are measuring a trans-capacitance to transmitter electrode 712, o are insensitive to touch (largely due to the shielding effect of the transmitter electrodes 712), yet sensitive to force because the measured capacity changes as dielectric layer 708 is compressed.

Figure 8:
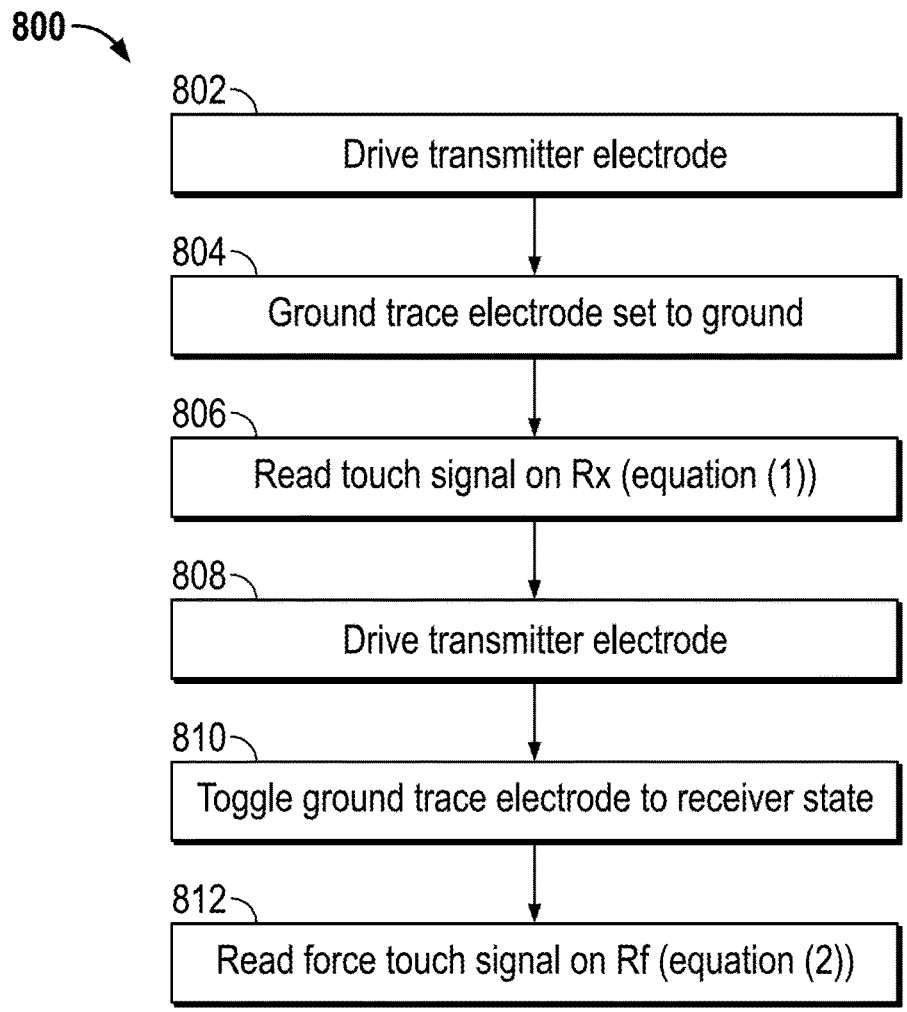
FIG. 8 is a flow chart of a method of operating an electronic system to drive and receive electrodes to determine force and touch information in accordance with an embodiment of the invention.

FIG. 8 is a flow chart of a method 800 of operating an electronic system to drive and receive signals from the electrodes shown in FIGS. 3, 4, and 6 to determine force and touch information in accordance with various embodiments. Method 800 involves toggling ground trace electrode 406 between a first (ground) state and a second (receiver) state as discussed above. More particularly, the processing system is configured to drive transmitter electrode 404 (task 802) and maintain ground trace electrode 406 at a ground or constant voltage (task 804). With ground trace electrode 406 in the first (ground) state, the processing system reads (task 806) the signal on touch receiver electrode 408 to obtain touch information (see equation (1) above).

Method 800 further involves driving transmitter electrode 404 (task 808) and toggling ground trace electrode 406 to a second (receiver) state (task 810). With ground trace electrode 406 in the second state, the processing system reads (task 812) the signal on force receiver electrode 406 to obtain force plus touch information (see equation (2) above).

In some embodiments, the force receiver electrode 406 may be held at a substantially constant potential. In such an embodiment, steps 804 and 810 may be omitted or otherwise accomplished within one step. In such an embodiment, method 800 involves driving a transmitter electrode (task 802), reading a resulting signal on a touch receiver electrode (task 806), driving the transmitter electrode (task 808) and reading a resulting signal on the force receiver electrode (task 812).

Furthermore, in some embodiments of the method 800, the steps 802 and 808 may be performed only once. In such an embodiments, the processing system is configured to drive a transmitter electrode (task 802), reading a resulting signal on the touch receiver electrode (806) and reading a resulting signal on the force receiver electrode 406 (task 812).

Referring now to FIGS. 9-12, it should be appreciated that in some embodiments one or more layers may be added to or removed from the stack-up 400 shown in FIG. 4 without impairing its function. For example, in the illustrated embodiment of FIG. 9, a stack-up 900 includes a first array of sensor electrodes 905 and a second array of sensor electrodes 909 may be disposed in a single layer on a substrate 944. In the illustrated embodiment, pliable component 901 comprises input surface 902 and the substrate 944 including first and second sensor electrode arrays 905 and 909. In another embodiment, the first and second arrays of sensor electrodes may be disposed on the input surface substrate 902 (e.g., on a side opposite of expected user input and contact); in this example, the pliable component would comprise the input surface 902 and first and second arrays of sensor electrodes 905 and 909.

Figure 9:
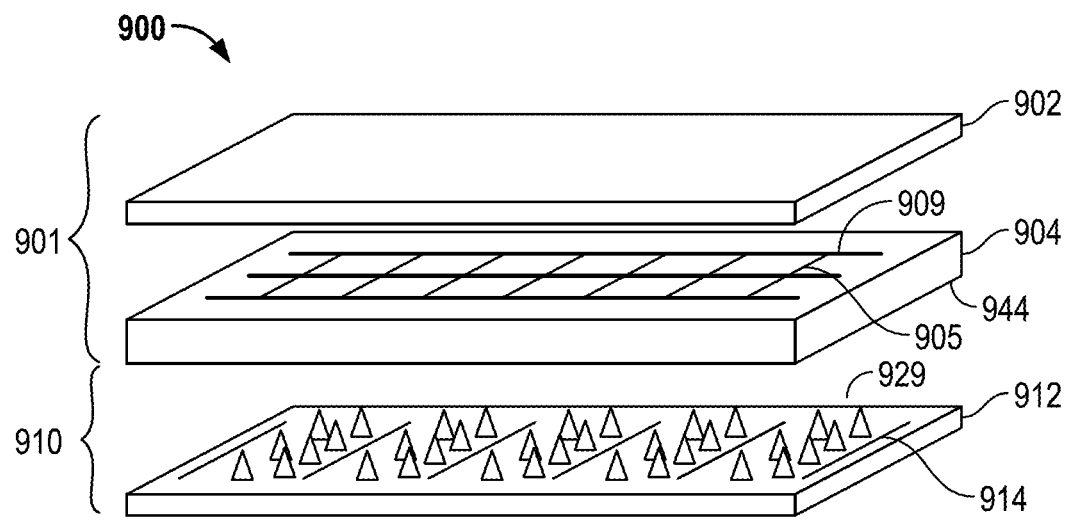
FIG. 9 is schematic perspective view of a pressure imaging sensor stack-up in accordance with an embodiment of the invention.

Still referring to FIG. 9, the input device may also include a third array of sensor electrodes 914 disposed on substrate 912. The input device further includes compressible layer (analogous to compressible layer 910) in the form of an array of compressible structures 929 disposed on substrate 912. In some embodiments, each individual electrode of the third array 914 is disposed "between" one or more individual compressible structures 929. In some embodiments, the compressible structures may be disposed on a side of substrate 944 (e.g. the side opposite the first and second array of sensor electrodes 905 and 909). In some embodiments, compressible structures may be disposed on both substrates 944 and 912. In the embodiment illustrated in FIG. 9, the third array of sensor electrodes 914 is arranged in a direction substantially parallel to the first array of sensor electrodes 905. In some embodiments, the third array of sensor electrodes 914 is arranged in a direction substantially parallel to the direction of one of the first and second arrays of sensor electrodes 905 and 909. Furthermore, in the embodiment of FIG. 9, the third array of sensor electrodes 914 substantially overlaps the first array of sensor electrodes 905 (when viewed from the top of the input device 900). The substrate 312 may also be configured to function as a back plane to resist force applied downwardly upon the top surface of the pliable component.

Figure 10:
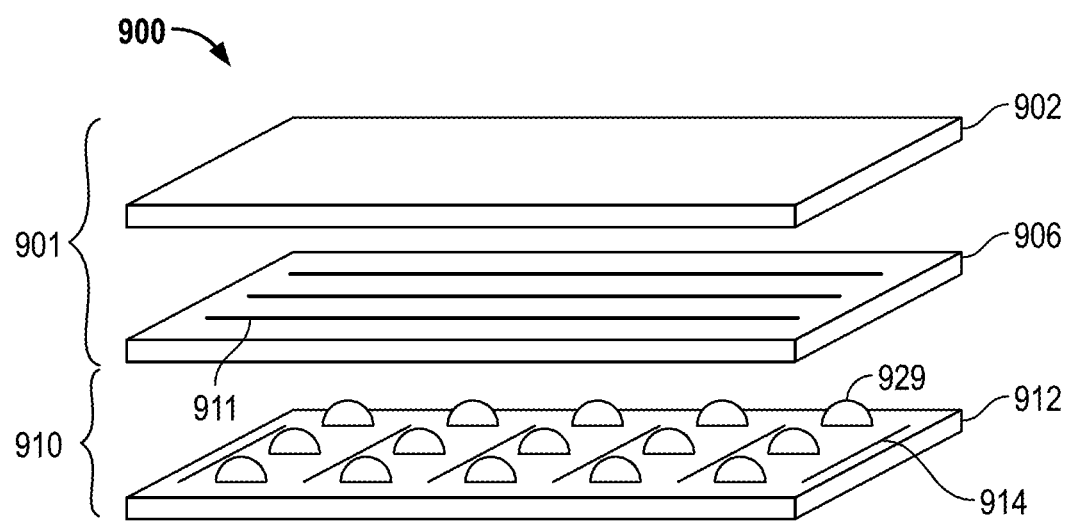
FIG. 10 is a schematic perspective view of a further embodiment of a pressure imaging sensor stack-up in accordance with an embodiment of the invention.

Referring now to FIG. 10, another embodiment of the pliable component 901 of input device 900 may include a flexible display 906. In some embodiments where the input device 900 includes a display, the same sensor electrode array used for sensing positional information may also be used for updating the display. In some embodiments, an array of sensor electrodes 911 may be disposed on the non-viewing side of the display 906. The sensor electrode array 911 is configured to sense force information for input objects contacting the input surface 902. Specifically, at least one electrode of the array 909 is configured to deflect, in response to force imparted on the input surface 902, toward the sensor electrode array 914 disposed on substrate 912.

Figure 11:
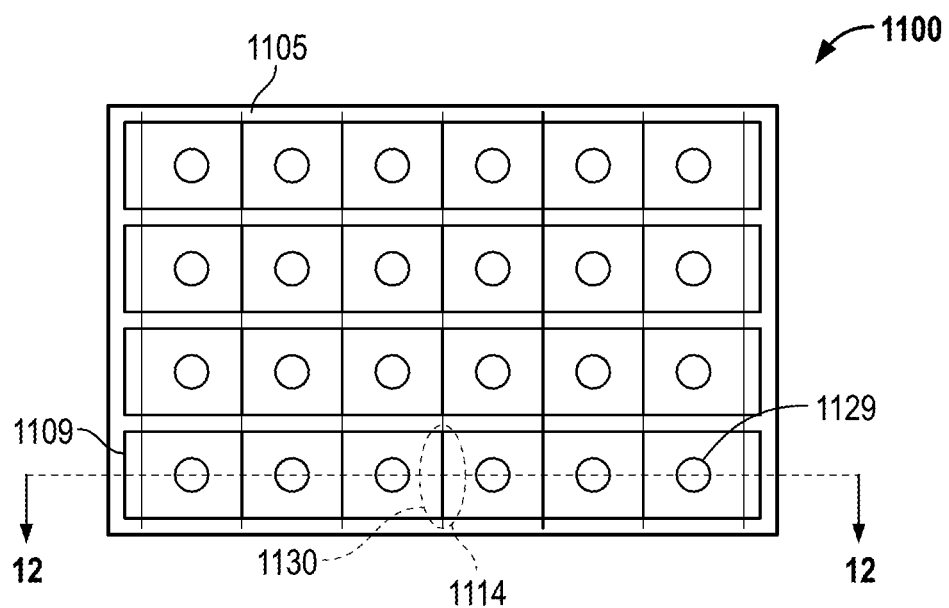
FIG. 11 is a top plan view of an input device in accordance with an embodiment of the invention.
Figure 12:
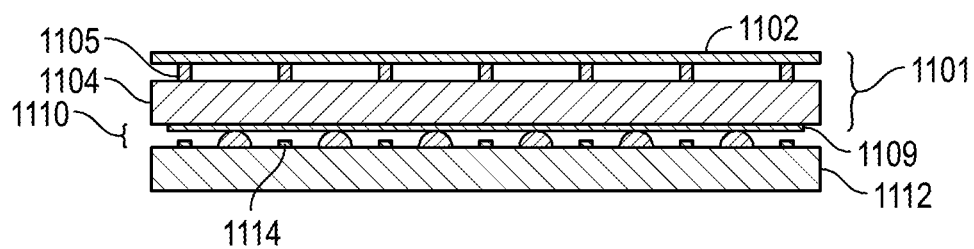
FIG. 12 is a cross section view along the line XI-XI of the input device of FIG. 11 in accordance with an embodiment of the invention.

FIGS. 11 and 12 are top view and cross section views, respectively, of an input device 1100 in accordance with various embodiments of the present invention. Device 1100 includes a pliable component 1101, a compressible layer 1110 and a support layer 1112. The pliable component comprises an input surface 1102, a first layer 1105 having a plurality of sensor electrodes, and a second layer 1109 having a plurality of sensor electrodes. The first and second sensor electrode layers 1105 and 1109 are configured to sense input objects in a sensing region of the input device. For example, in one embodiment, the second plurality of sensor electrodes 1109 are configured to transmit a sensing signal and the first plurality of sensor electrodes 1105 are configured to receive a resulting signal. While the first and second sensor electrode arrays 1105 and 1109 are shown as being disposed on opposite sides of sensor substrate 1104, in various other embodiments, the first and second sensor electrode arrays 1105 and 1109 may be disposed in a single layer or multiple layers on either side of the sensor substrate 1104 or input surface 1102.

A third array of sensor electrodes 1114 is disposed on the support layer 1112, the third array of sensor electrodes substantially overlapping the first array of sensor electrodes 1105. The second and third pluralities of sensor electrodes 1109 and 1114 are configured to sense a deflection of the pliable component 1101 (and sensor electrodes 1109) towards the support layer 1112 (and sensor electrodes 1114) in response to a force applied to the input surface 1102 of the input device 1100.

The second plurality 1109 and third plurality 1114 of sensor electrodes are capacitively coupled to each other, forming a plurality of respective variable capacitances in the area of intersections/overlap between the two arrays. One exemplary variable capacitance is shown in FIG. 11 and referred to as a force pixel (or "fixel") 1130. As used herein, the term "force pixel" refers to an area of overlap between a sensor electrode of the second sensor electrode array 1109 and a corresponding sensor electrode of the third sensor electrode array 1114. The term "force pixel" may also refer to an area of localized capacitance between individual sensor electrodes of the second array of sensor electrodes 1109 and the third array of sensor electrodes 1114. As discussed above, a force applied to the input surface 1102 causes pliable component 1101 to deform and deflect locally, decreasing the distance between one or more electrodes of the second array of sensing electrodes 1109 and one or more electrodes of the third array of sensing electrodes 1114 in the localized region of deformation.

By properly configuring the various mechanical properties and dimensions of the pliable component 1101 and the compressible layer 1110 using known modeling and simulation techniques, an applied force which deflects the pliable component 1101 results in a change in at least one variable capacitance (force pixel) of the array of variable capacitances formed between the second and third arrays of sensor electrodes. A measurement of the change in the variable capacitance(s) can be used to determine the magnitude of force applied to the input surface in the localized area corresponding to the deflection. In various embodiments, the applied force may be determined based on a plurality of variable capacitances, which allows the processing system to interpolate the force information among a plurality of contiguous force pixels.

As illustrated in the embodiment of FIGS. 11 and 12, the compressible layer may form an array of individual compressible structures 1129. While the array of compressible structures is shown to be disposed on the supporting substrate 1112, in other embodiments, the compressible structures may be disposed on a separate substrate which is then physically coupled to either the supporting substrate 1112 or sensor substrate 1104. Also, in various embodiments, the compressible layer may comprise a grid of compressible structures, or other suitable shapes. The compressible layer is configured to facilitate the local deflection of the pliable component 1101 toward the third layer of sensor electrodes 1114 in response to force applied to the input surface 1102. A measurement of the "force pixel" is used to determine the amount (magnitude) of localized force imparted on the input surface in at least one location.

An input device is thus provided which includes a first plurality of sensor electrodes disposed in a first layer and configured to detect input objects at an input surface of the input device, the first plurality of sensor electrodes including a first subset of transmitter electrodes; a second plurality of sensor electrodes configured to detect a force imparted to the input surface and configured for capacitive coupling with the first subset of transmitter electrodes; and a compressible dielectric configured to compress in response to force applied to the input surface; wherein the capacitive coupling between the transmitter electrodes and the second plurality of sensor electrodes varies in response to the applied force.

In an embodiment, the second plurality of sensor electrodes may be disposed in a second layer such that the first layer is disposed between the input surface and the second layer, and the compressible dielectric may be disposed between the first layer and the second layer.

In another embodiment, the second plurality of sensor electrodes may be disposed in the first layer, and the compressible dielectric may be disposed between the first layer and a conductor. Moreover, the first plurality of sensor electrodes may include a second subset of receiver electrodes capacitively coupled to the first subset of transmitter electrodes and configured to detect input objects in the at the input surface; and each electrode in the second plurality of sensor electrodes may be disposed between a transmitter electrode and an electrode from the second subset.

In an embodiment, the input device also may include a processing system communicatively coupled to the first and second plurality of electrodes and configured to: drive a sensing signal onto the first subset of transmitter electrodes; receive a first type of resulting signal from the second plurality of electrodes; and receive a second type of resulting signal from a second subset of the first plurality of electrodes; wherein the processing system is configured to determine positional and force information for an input object based on the first and second type of resulting signals.

In an embodiment, the first type of resulting signal includes effects of force applied to the input surface, and the second type of resulting signal includes effects of an input object in the sensing region. Moreover, the first type of resulting signal may be received from the second plurality of electrodes while the second subset of electrodes is at a predetermined constant voltage, and the second type of resulting signal may be received from the second subset of electrodes while the second plurality of electrodes is at a predetermined constant voltage.

In an embodiment, the processing system is further configured to receive the first type of resulting signal from the second plurality of electrodes and receive the second type of resulting signals from the second subset of the first plurality of electrodes, wherein both the first and second type of resulting signal correspond to a single sensing signal driven on the first subset of transmitter electrodes.

An input device is provided which includes a first plurality of sensing electrodes disposed in a first layer and configured to detect input objects in a sensing region of the input device, the first plurality of sensor electrodes including a first subset of transmitter electrodes; a second plurality of sensor electrodes disposed in a second layer such that the first layer is disposed between the input surface and the second layer, the second plurality of sensor electrodes being configured to detect a force imparted to the input surface and configured for capacitive coupling with the first subset of transmitter electrodes; a compressible dielectric configured to compress in response to force applied to the input surface such that the capacitive coupling between the transmitter electrodes and the second plurality of sensor electrodes varies in response to the applied force; and a processing system communicatively coupled to the first and second plurality of electrodes and configured to: drive a sensing signal onto the first subset of transmitter electrodes; receive a first type of resulting signal, including effects of the force imparted on the input surface, from the second plurality of sensing electrodes; receive a second type of resulting signal, including effects of an input object in proximity to the input surface, from a second subset of the first plurality of electrodes; and determine positional and force information for an input object based on the first and second type of resulting signals.

In an embodiment, the compressible dielectric may be disposed between the first layer and the second layer. Alternatively, the compressible dielectric may be disposed between the second layer and a rigid substrate.

An input device is also provided which includes: a first plurality of sensor electrodes, a second plurality of sensor electrodes, and a third plurality of sensor electrodes disposed in a single layer of a sensor substrate; a compressible dielectric disposed between the sensor substrate and a conductor; and a processing system communicatively coupled to the first, second, and third pluralities of sensor electrodes. The processing system may be configured to: drive a sensing signal onto the first plurality of sensor electrodes; receive a first type of resulting signal from the second plurality of electrodes, the first type of resulting signal comprising effects of a capacitive coupling between the first plurality and the second plurality of electrodes; and receive a second type of resulting signal from the third plurality of electrodes, the second type of resulting signal comprising effects of a capacitive coupling between the first plurality and the third plurality of electrodes. Moreover, the processing system may be configured to determine positional and force information from the first and second type of resulting signals.

In another embodiment, the processing system is configured to control the capacitive coupling between the first plurality of electrodes and the second plurality of electrodes using an electrode from the third plurality of electrodes such that the capacitive coupling remains substantially constant in response to a deflection of the sensor substrate relative to the conductor. The processing system may also be configured to adjust one of the received first and second type of resulting signals using the other of one of the received first and second type of resulting signal.

In another embodiment, the width of each electrode of the second plurality of electrodes is at least as large as a spacing between the first plurality of sensor electrodes and the conductor, wherein the spacing corresponds to the compressible dielectric.

In another embodiment, the first type of resulting signals are substantially immune to the effects of deflection of the substrate due to the second plurality of electrodes being selectively maintained at a predetermined constant voltage.

A processing system is also provided for use with an input device of the type including a plurality of transmitter electrodes, a first plurality of sensor electrodes configured to detect input objects at an input surface, a second plurality of sensor electrodes configured to detect a force imparted to the input surface, and a compressible dielectric configured to compress in response to force applied to the input surface, wherein a capacitive coupling between the transmitter electrodes and the second plurality of sensor electrodes varies in response to the applied force. The processing system may be communicatively coupled to the transmitter electrodes and the first and second plurality of sensor electrodes, and configured to: drive a sensing signal onto the transmitter electrodes; receive a first type of resulting signal from the first plurality of sensor electrodes; and receive a second type of resulting signal from a second plurality of sensor electrodes. Moreover, the processing system may be configured to determine positional and force information for an input object based on the first and second type of resulting signals.

In another embodiment, the processing system may be configured to receive the first type of resulting signal from the second plurality of electrodes and receive the second type of resulting signals from the second subset of the first plurality of electrodes, wherein both the first and second type of resulting signal correspond to a single sensing signal driven on the first subset of transmitter electrodes.

In a further embodiment, the processing system is further configured to, after driving the sensing signal onto the transmitter electrodes, repeatedly: receive the first type of resulting signal; and thereafter receive the second type of resulting signal.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device comprising:
    a first plurality of sensor electrodes disposed in a first layer and configured to detect input objects in a sensing region of the input device, the first plurality of sensor electrodes including a plurality of transmitter electrodes and a plurality of receiver electrodes;
    a plurality of force receiver sensor electrodes disposed in a second layer configured to detect a force imparted to an input surface and configured for capacitive coupling with a first subset of transmitter electrodes;
    a non-compressible layer disposed between the first layer and the second layer;
    a compressible dielectric configured to compress in response to force applied to the input surface, wherein the second layer is disposed between the first layer and the compressible dielectric; and
    a processing system communicatively coupled to the first plurality of sensor electrodes and the plurality of force receiver sensor electrodes configured to:
        determine positional information for input objects in the sensing region based on first resulting signals obtained from the first plurality of sensor electrodes, and
        determine force information for input objects in the sensing region based on second resulting signals obtained from the plurality of force receiver sensor electrodes.

2. The input device of claim 1, further comprising a display and wherein the processing system is further configured to update the display.

3. The input device of claim 2, wherein at least a subset of the first plurality of sensor electrodes is configured for display updating.

4. The input device of claim 1, wherein the processing system is configured to determine the positional information and the force information for input objects in the sensing region by:
- driving a sensing signal onto the transmitter electrodes;
- receiving, based on the sensing signal, the second resulting signals from the plurality of force receiver sensor electrodes; and
- receiving, based on the sensing signal, the first resulting signals from the receiver electrodes.

5. The input device of claim 4, wherein the first resulting signals comprises effects of a change in capacitive coupling between the plurality of transmitter electrodes and the plurality of receiver electrodes due to input objects in the sensing region.

6. The input device of claim 4, wherein the processing system determines the second resulting signals from the plurality of force receiver sensor electrodes while the receiver electrodes are held at a predetermined constant voltage.

7. The input device of claim 4, wherein the first resulting signals and the second resulting signals both correspond to a single sensing signal driven on the transmitter electrodes.

8. The input device of claim 4, wherein the second resulting signals comprises effects of a change in capacitive coupling between the transmitter electrodes and the plurality of force receiver sensor electrodes due to the force applied to an input surface.

9. An input device comprising:
- a first plurality of sensor electrodes disposed in a first layer and configured to detect input objects in a sensing region of the input device, the first plurality of sensor electrodes including a first subset of transmitter electrodes and a second subset of receiver electrodes;
- a second plurality of sensor electrodes disposed in a second layer such that the first layer is disposed between an input surface and the second layer, the second plurality of sensor electrodes being configured to detect a force imparted to the input surface and configured for capacitive coupling with the first subset of transmitter electrodes;
- a non-compressible layer disposed between the first layer and the second layer;
- a compressible dielectric configured to compress in response to force applied to the input surface such that the capacitive coupling between the first subset of transmitter electrodes and the second plurality of sensor electrodes varies in response to the applied force, the compressible dielectric disposed such that the second layer is disposed between the first layer and the compressible dielectric; and
- a processing system communicatively coupled to the first plurality of sensor electrodes and the second plurality of sensor electrodes and configured to:
  - drive a sensing signal onto the first subset of transmitter electrodes;
  - receive a first type of resulting signal, including effects of the force imparted on the input surface, from the second plurality of sensor electrodes;
  - receive a second type of resulting signal, including effects of an input object in proximity to the input surface, from the second subset of receiver electrodes; and
  - determine positional and force information for the input object based on the first type of resulting signal and the second type of resulting signal.

10. The input device of claim 9, wherein the compressible dielectric is disposed between the second layer and a rigid substrate.

11. A processing system for an input device, the input device comprising a display, a first plurality of sensor electrodes configured to detect input objects in a sensing region, a second plurality of sensor electrodes configured to detect a force imparted to an input surface, a non-compressible layer disposed between the first plurality of sensor electrodes and the second plurality of sensor electrodes, and a compressible dielectric configured to compress in response to force applied to the input surface, wherein the second plurality of sensor electrodes is disposed between the first plurality of sensor electrodes and the compressible dielectric, wherein a capacitive coupling of the second plurality of sensor electrodes and a conductor varies in response to the applied force, the processing system communicatively coupled to the first plurality of sensor electrodes and the second plurality of sensor electrodes and configured to:
- drive a sensing signal onto a first subset of the first plurality of sensor electrodes;
- receive a first type of resulting signal from the second subset of the first plurality of sensor electrodes; and
- receive a second type of resulting signal from a second plurality of sensor electrodes;
- wherein the processing system is configured to determine positional and force information for an input object based on the first type of resulting signal and second type of resulting signals.

12. The processing system of claim 11, wherein the processing system is further configured to update the display using at least one of the first subset and the second subset of the first plurality of sensor electrodes.

13. The processing system of claim 11, wherein the processing system is further configured to determine positional information for input objects in the sensing region using absolute capacitive sensing.

14. The processing system of claim 11, wherein the second type of resulting signal comprises effects of a change in capacitive coupling between the second plurality of sensor electrodes and the conductor.

15. The processing system of claim 14, wherein the conductor is part of the display.

16. The processing system of claim 15, wherein the processing system is configured to drive a sensing signal onto the conductor and the second type of resulting signal comprises effects of the driven signal.

* * * * *